United States Patent Office 3,409,694
Patented Nov. 5, 1968

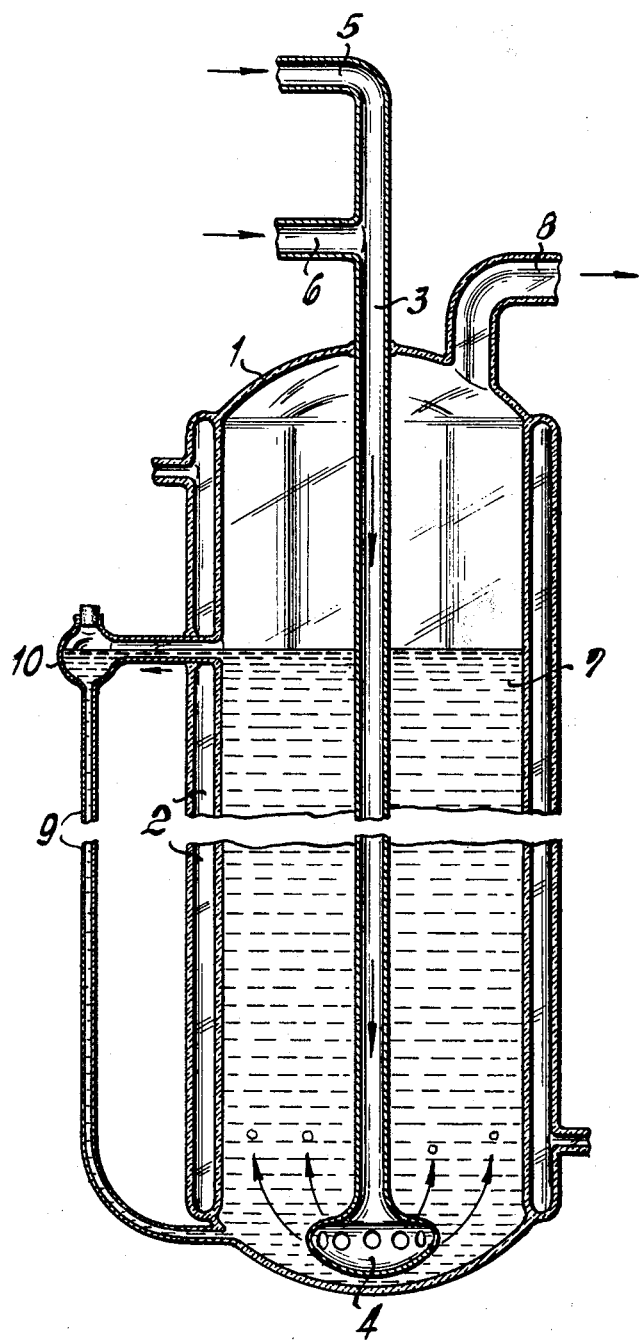

3,409,694
PROCESS FOR THE MANUFACTURE OF
MONOVINYLACETYLENE
Kurt Sennewald, Knapsack, near Cologne, Alexander
Ohorodnik, Liblar, Werner Mittler, Frechen, Karl
Kaiser, Bruhl, and Paul Stutzke, Walberberg, Germany,
assignors to Knapsack Aktiengesellschaft, Knapsack,
near Cologne, Germany, a corporation of Germany
Filed Oct. 17, 1966, Ser. No. 587,201
Claims priority, application Germany, Oct. 28, 1965,
K 57,510
7 Claims. (Cl. 260—678)

ABSTRACT OF THE DISCLOSURE

Simultaneous introduction of acetylene and an inert organic normally liquid solvent for monovinylacetylene into a reaction zone containing a catalyst solution, continuous withdrawal of gaseous mixture containing monovinylacetylene reaction product from said reaction zone and recovery of said monovinylacetylene from withdrawn gaseous mixture.

---

The invention relates to a process for the continuous manufacture of monovinylacetylene by introducing acetylene into an aqueous solution of cuprous chloride which is used as the catalyst, the resulting monovinylacetylene being continuously withdrawn from the catalyst solution by means of an inert organic solvent as the extracting and expelling agent.

It is known that monovinylacetylene can be prepared by introducing acetylene into an aqueous solution of cuprous chloride, which may also contain an alkali metal chloride, at a temperature varying between about 50 and 100° C., at atmospheric or elevated pressure. This results in the formation of the product desired to be produced and in the formation of by-products including divinylacetylene and higher acetylene polymers. The latter are resinous compounds which contaminate the aqueous catalyst solution and reduce the activity of the catalyst. The volatile reaction products, particularly monovinylacetylene, leave the reaction chamber together with the unreacted portion of the acetylene stream used as the feed, and they are isolated in customary manner, e.g. by condensation and fractional distillation. The yield of monovinylacetylene can be improved and the formation of undesirable by-products can be reduced by increasing the velocity of flow of the acetylene introduced into the catalyst solution. This necessarily results in shorter sojourn times for the acetylene in the catalyst solution and in lower acetylene conversion rates which means that reaction gas with a relatively low content of monoxinylacetylene which is difficult to work up, is obtained.

In further prior art processes it has been attempted by the selection of appropriate steps to obviate the sidereactions, namely the formation of acetylene polymers, encountered in the above process, or at least to remove these by-products from the catalyst solution, and thereby to increase the yield of monovinylacetylene. This can be achieved e.g. by the method disclosed in German Patent 1,054,989. The prcoess for the continuous manufacture of monovinylacetylene disclosed in that patent, wherein acetylene is allowed to bubble through an aqueous solution of cuprous chloride used as the catalyst comprises dispersing in the catalyst solution 1.5 to 20% of a monoalkylether of diethylene glycol containing 1 to 8 carbon atoms in the alkyl group, the percentages being referred to the weight of the catalyst solution, removing the catalyst solution which includes the dispersed diethylene glycol monoalkylether, allowing the catalyst solution to precipitate in two layers, separating the two layers from one another, and recycling the layer constituting the catalyst solution. This process can be carried out with the use of a column having perforated bottoms. The upper column portion receives the catalyst solution and the lower column portion receives the acetylene. Monovinylacetylene is withdrawn together with unreacted acetylene at the head of the column. A decisive disadvantage associated with this process accrues from the fact that the catalyst solution is required to be continuously withdrawn from the reaction chamber and to be isolated from the dispersant in a separate separator. The dispersant in turn calls for separate purifying treatment to be freed from higher acetylene polymers.

A still further process for the manufacture of monovinylacetylene, which is similar to the process described above in the use of a two-phase system, has been described in U.S. Patent 2,934,576.

As taught therein, monovinylacetylene is produced by the continuous introduction of acetylene into a mixture prepared by agitation and formed of two immiscible solvents. One of these two solvents contains dissolved cuprous chloride as the catalyst, and the second solvent is intended to receive the acetylene polymers, particularly monovinylacetylene. For example, when water or dimethyl formamide is used as the solvent for the catalyst, it is possible to use diethylene glycol monobutylether, kerosene or n-hexane as the second phase solvent for the acetylene polymers. The reaction temperature, pressure and boiling point of the solvents are so selected that the reaction takes place in the liquid phase. For isolation of the monovinylacetylene, a portion of the reaction solution is continuously withdrawn from the reactor, the immiscible phases are separated from one another in a separator, the catalyst-containing phase is recycled into the reactor, and the monovinylacetylene is expelled in a stripping column by subjecting the acetylene-containing phase to distillation.

As this earlier process teaches withdrawing always no more than a portion of the monovinylacetylene-containing reaction solution for working up, it is impossible to prevent the monovinylacetylene present in the remaining portion of the catalyst solution from reacting further with the formation of higher acetylenes, which is disadvantageous. The use of agitators for dispersing the immiscible phases would also appear to be anything else than harmless with a view to the readily explosive higher acetylenes present in the reactor.

These prior art methods are substantially improved by the present invention which enables monovinylacetylene to be produced in continuous fashion in technically simple reactors having no moved mechanical parts, while the formation of by-products is essentially obviated.

The process of the present invention for the continuous manufacture of monovinylacetylene by introducing acetylene, at a temperature varying between 40 and 100° C. and under an acetylene gas pressure varying between 0.01 and 10 atmospheres gauge, into a solution of cuprous chloride in aqueous hydrochloric acid, i.e. into a solution similar to a Nieuwland catalyst, comprises more especially introducing into the catalyst solution acetylene and simultaneously therewith an inert organic solvent as the extracting and expelling agent for monovinylacetylene, the solvent travelling in vapor form through the catalyst solution and continuously expelling therefrom monovinylacetylene formed by dimerization of the acetylene, and isolating then the monovinylacetylene in conventional manner from the mixture in vapor form by subjecting it to condensation and fractional distillation.

The inert solvent can be introduced in liquid or vapor form into the catalyst solution. The solvents used preferably include those which have a boiling point varying between about 20° C. and at most 100° C., such as methanol, benzene, chloroform, acetonitrile, acetone, n-hexane or methylethylketone. Acetone is the preferred solvent especially when the catalyst temperature is 60° C. Generally, the solvent is employed in a proportion of about 5 to 50% by volume, referred to the total gas volume.

The composition of the catalyst solution is no part of the present invention, but a Nieuwland catalyst containing up to 0.5% by weight, preferably 0.1 to 0.2% by weight, free hydrochloric acid should conveniently be used. The catalyst solution may also contain agents which are known to be complex formers for cuprous chloride, such as alkali metal chlorides, ammonium chlorides, amine hydrochlorides or appropriate mixtures thereof. Furthermore, the catalyst should preferably have a density varying between 1.3 and 1.8 g./cc., more preferably a density of 1.6 g./cc.

The process of the present invention can be carried out e.g. with the use of the apparatus shown diagrammatically in the accompanying drawing, which has a total height of 2.90 meters. The apparatus, formed of a glass cylinder 1, has an internal width of 50 mm., a height of 2900 mm., and a heating jacket 2 for adjustment of the catalyst temperature. Into glass cylinder 1 penetrates from above a feed line 3, extended to the bottom of the glass cylinder. At its lower end, the feed line 3 carries a gas distributing head 4 and its upper portion carries a pipe connection 5 for the supply of acetylene and a pipe connection 6 for the supply of solvent. The glass cylinder is filled with the catalyst solution 7 to about half its volume. Monovinylacetylene expelled together with the solvent vapors from the catalyst solution is withdrawn through a discharge pipe 8 and isolated from the gas mixture in customary manner. The glass cylinder 1 also has laterally disposed thereto a by-pass pipe 9 and an intermediate container 10 for withdrawing samples of the catalyst solution from the glass cylinder, if deemed convenient. The by-pass line 9 and the intermediate container 10 are omitted when the process is carried out under pressure.

As compared with the prior art methods, the process of the present invention is distinguished by the easiness with which it can be executed and by its high commercial efficiency. The solvent used in accordance with the present invention is caused to travel in the state of fine subdivision, i.e. in vapor form, and together with the acetylene through the catalyst solution. This means that monovinylacetylene formed is continuously removed from the catalyst solution and thus prevented from reacting further with acetylene to give higher acetylene polymers. The omission of stirring means in the reactor on the other hand eliminates the danger otherwise encountered in carrying out such process, as already mentioned above.

The following examples illustrate the invention, Examples 1 and 5 being comparative examples disclosing prior art processes:

EXAMPLE 1

The apparatus shown in the accompanying drawing was charged with 4 liters of a catalyst solution composed, per liter, of:

|  | Grams |
|---|---|
| Cuprous chloride | 533 |
| Potassium chloride | 402 |
| Hydrogen chloride | 2.0–3.2 |
| Water | 663 |

380 normal liters (measured at N.T.P.) acetylene and 184 normal liters nitrogen were introduced per hour into the catalyst solution heated to 60° C. The composition of the gas mixture leaving the reactor overhead was determined by gas-chromatography. Monovinylacetylene was obtained in a yield of 68% for an acetylene conversion rate of 19% by weight which entailed the formation of monovinylacetylene, divinylacetylene, hexadienine-1, acetaldehyde, vinyl chloride, 2-chlorobutadiene-1,3, and $C_8H_8$ polymers.

EXAMPLE 2

374 normal liters acetylene and 174 normal liters or 452 grams acetone in vapor form were introduced per hour, in a manner analogous to that described in Example 1, into the catalyst solution heated to 60° C. 19.3% of the acetylene introduced underwent conversion. Monovinylacetylene was obtained in a yield of 80%, referred to the acetylene which underwent conversion.

EXAMPLE 3

392 normal liters acetylene and 375 normal liters or 972 grams gaseous acetone were introduced per hour, in a manner analogous to that described in Example 2, into the catalyst solution. The gaseous acetone was used in a proportion larger than that employed in Example 2. This enabled the yield in monovinylacetylene to be increased to 89% for an acetylene conversion rate of 16%. The yield in monovinylacetylene could be further improved to 94% by increasing the proportion of gaseous acetone introduced per hour to a value of 548 normal liters or 1420 grams.

EXAMPLE 4

390 liters acetylene and 194 liters or 625 grams gaseous methylethylketone were introduced per hour, in a manner analogous to that described in Example 2, into the catalyst solution. Monovinylacetylene was obtained in a yield of 76%, referred to the acetylene conversion rate of 22%.

EXAMPLE 5

A mixture of 555 normal liters acetylene and 330 normal liters nitrogen was introduced per hour into 3 liters catalyst solution heated to 60° C., in a manner analogous to that described in Example 1 and with the use of a reactor in which the by-pass pipe was omitted. The gas mixture leaving the reactor was throttled by means of a valve and a pressure of 1754 mm. mercury was adjusted at the acetylene inlet in the reactor. The gas mixture withdrawn was analyzed by gas-chromatography, as already mentioned above. The catalyst produced 25.3 grams monovinylacetylene per liter of catalyst per hour, and monovinylacetylene was obtained in a total yield of 70.5%, referred to the 16.7% acetylene conversion rate.

EXAMPLES 6 TO 10

These examples were carried out in a manner analogous to that described in Example 5, save that a certain proportion of acetone in vapor form was allowed to travel under pressure and simultaneously with the acetylene/nitrogen gas mixtures through the catalyst solution. The results obtained are compiled in the following table:

TABLE 1

| Example | 6 | 7 | 8 | 9 | 10 |
|---|---|---|---|---|---|
| Quantity of gas introduced in liter: |  |  |  |  |  |
| $C_2H_2$ (normal liters/hr.) | 532 | 655 | 610 | 576 | 542 |
| $N_2$ (normal liters/hr.) | 280 | 81 | 57 | 27 | 78 |
| Acetone (normal liters/hr.) | 82 | 143 | 248 | 284 | 252 |
| Pressure prevailing at acetylene inlet in mm. Hg | 1,737 | 1,752 | 1,751 | 1,750 | 1,777 |
| Monovinylacetylene yield in percent | 80.4 | 83.8 | 85.2 | 88.4 | 94.2 |
| $C_2H_2$ conversion rate in percent | 14.2 | 14.0 | 13.1 | 14.7 | 11.4 |
| Catalyst activity in grams monovinylacetylene per liter of catalyst per hour | 22.6 | 29.2 | 24.5 | 28.8 | 22.5 |

EXAMPLES 11 AND 12

These examples were carried out in a manner analogous to that described in Example 5, save that the acetylene/nitrogen gas mixture introduced into the catalyst solution was replaced with an acetylene/chloroform gas mixture (Example 11) and with an acetylene/benzene gas mixture (Example 12).

The results obtained are shown in the following Table 2:

TABLE 2

| Example | 11 | 12 |
|---|---|---|
| Quantity of gas introduced: | | |
| C₂H₂ (normal liters/hr.) | 726 | 775 |
| Chloroform (normal liters/hr.) | 244 | |
| Benzene (normal liters/hr.) | | 119 |
| Pressure prevailing at gas inlet (mm. Hg) | 1,753 | 1,757 |
| Monovinylacetylene yield in percent | 80.0 | 87.3 |
| C₂H₂ conversion rate in percent | 15.9 | 16.3 |
| Catalyst activity (grams monovinylacetylene per liter of catalyst per hour) | 26.5 | 35.3 |

We claim:

1. In the process of manufacturing monovinylacetylene by introducing acetylene at a temperature between 40 and 100° C. and at a pressure between 0.01 and 10 atmospheres gauge into a reaction zone containing a solution of cuprous chloride in aqueous hydrochloric acid, the improvement which comprises simultaneously introducing an inert organic solvent for monovinylacetylene into said catalyst solution, maintaining said solvent in the gaseous state during contact with said catalyst solution, continuously withdrawing resulting gaseous mixture containing acetylene, monovinylacetylene and said solvent from said reaction zone and recovering withdrawn monovinylacetylene from said withdrawn gaseous mixture.

2. The process of claim 1, wherein the inert organic solvent is introduced in liquid form into the catalyst solution.

3. The process of claim 1, wherein the inert organic solvent is introduced in vapor form into the catalyst solution.

4. The process of claim 1, wherein the inert organic solvent is a solvent having a boiling point varying between about 20° C. and at most 100° C.

5. The process of claim 1, wherein the solvent is used in a proportion varying between about 5 and 50% by volume, referred to the total gas volume.

6. The process of claim 1, wherein the inert solvent is at least one member selected from the group consisting of methanol, benzene, chloroform, acetonitrile, acetone, n-hexane, and methylethylketone.

7. The process of claim 1, wherein acetone as the extracting and expelling agent is introduced into the catalyst solution heated to 60° C.

References Cited

FOREIGN PATENTS 640,262  4/1962  Canada.
913,997  12/1962  Great Britain.

DELBERT E. GANTZ, *Primary Examiner.*

J. D. MYERS, *Assistant Examiner.*

UNITED STATES PATENT OFFICE
CERTIFICATE OF CORRECTION

Patent No. 3,409,694　　　　　　　　　　　　　November 5, 1968

Kurt Sennewald et al.

It is certified that error appears in the above identified patent and that said Letters Patent are hereby corrected as shown below:

Column 1, line 52, "monoxinyl" should read -- monovinyl --. Column 4, line 55, "mixtures" should read -- mixture --; same column, TABLE 1, sixth column, line 2 thereof, "78" should read -- 25 --; same table, same column, line 3 thereof, "252" should read -- 278 --.

Signed and sealed this 17th day of March 1970.

SEAL)

Attest:

Edward M. Fletcher, Jr.　　　　　　　　　　WILLIAM E. SCHUYLER, JR.
Attesting Officer　　　　　　　　　　　　　　　Commissioner of Patents